US009208435B2

(12) United States Patent
Zelevinsky

(10) Patent No.: US 9,208,435 B2
(45) Date of Patent: Dec. 8, 2015

(54) DYNAMIC CREATION OF TOPICAL KEYWORD TAXONOMIES

(75) Inventor: Vladimir Zelevinsky, Brookline, MA (US)

(73) Assignee: Oracle OTC Subsidiary LLC, Redwood Shores, CA (US)

( * ) Notice: Subject to any disclaimer, the term of this patent is extended or adjusted under 35 U.S.C. 154(b) by 513 days.

(21) Appl. No.: 12/776,715

(22) Filed: May 10, 2010

(65) Prior Publication Data

US 2011/0276581 A1 Nov. 10, 2011

(51) Int. Cl.
*G06F 17/30* (2006.01)
*G06N 5/02* (2006.01)

(52) U.S. Cl.
CPC ............ *G06N 5/02* (2013.01); *G06F 17/30643* (2013.01); *G06F 17/30867* (2013.01)

(58) Field of Classification Search
CPC .............. G06N 5/02; G06N 17/30643; G06N 17/30867
USPC .............. 704/9; 707/722, 736, 737, 738, 739, 707/754, 765, 766, 767, 769, 771, 778, 794, 707/E17.074, E17.005, 999.003, 999.004, 707/999.005
See application file for complete search history.

(56) References Cited

U.S. PATENT DOCUMENTS

| 6,282,532 | B1 | 8/2001 | Sandell |
| 6,519,586 | B2 | 2/2003 | Anick et al. |
| 7,117,207 | B1 | 10/2006 | Kerschberg |
| 2003/0217052 | A1* | 11/2003 | Rubenczyk et al. ............. 707/3 |
| 2006/0026147 | A1* | 2/2006 | Cone et al. ........................ 707/3 |
| 2007/0100801 | A1* | 5/2007 | Celik et al. ........................ 707/3 |
| 2007/0156677 | A1* | 7/2007 | Szabo ............................... 707/5 |
| 2007/0174270 | A1* | 7/2007 | Goodwin et al. ................ 707/5 |
| 2008/0133479 | A1* | 6/2008 | Zelevinsky et al. ............. 707/3 |
| 2010/0036829 | A1* | 2/2010 | Leyba .............................. 707/5 |

OTHER PUBLICATIONS

Kiduk Yang, Elin K. Jacob, Aaron Loehrlein, Seungmin Lee, Ning Yu, Organizing the Web: Semi-Automatic Construction of a Faceted Scheme, School of Library and Information Science, Indiana University, Bloomington, Indiana, USA.

Emilia Stoica and Marti A. Hearst, Demonstration: Using Wordnet to Build Hierarchical Facet Categories, School of Information UC Berkeley.

(Continued)

*Primary Examiner* — Grace Park
(74) *Attorney, Agent, or Firm* — Miles & Stockbridge, P.C.

(57) ABSTRACT

System and methods for dynamically generating taxonomies of keywords and/or descriptors are provided. In one example, a navigation system for accessing a corpus of information provides for dynamic taxonomy generation expanding upon a topic entered by a user in a user interface. The navigation system generates, dynamically, at least one term associated with the received topic from at least one sense or meaning retrieved from a semantic network. The navigation system is further configured to present to the user the at least one term as a selectable refinement in response to receiving the topic entered by the user in the user interface. The system can also be configured to retrieve terms and/or senses from the semantic network and evaluate any retrieved terms for their informativeness. The system can further cache any information generated during taxonomy creation and update the corpus to reflect useful refinements.

27 Claims, 10 Drawing Sheets

(56) References Cited

OTHER PUBLICATIONS

Wisam Dakka, Rishabh Dayal, and Panagiotis G. Ipeirotis, Automatic Discovery of Useful Facet Terms, SIGIR '06 Seattle Washington, USA, Copyright 2006.

Yang, K, Jacob, E., Loehrlein, A., Lee, S., Yu, N. Organizing the Web: Semi-automatic construction of a faceted scheme. IADIS International Conference WWW/Internet, 2004.

W. Dakka, R. Dayal, and P. Ipeirotis, Automatic discovery of useful facet terms. ACM SIGIR 2006 Workshop on Faceted Search, Aug. 2006.

E. Stoica and M. Hearst, Demonstration: Using WordNet to Build Hierarchical Facet Categories. ACM SIGIR 2006 Workshop on Faceted Search, Aug. 2006.

* cited by examiner

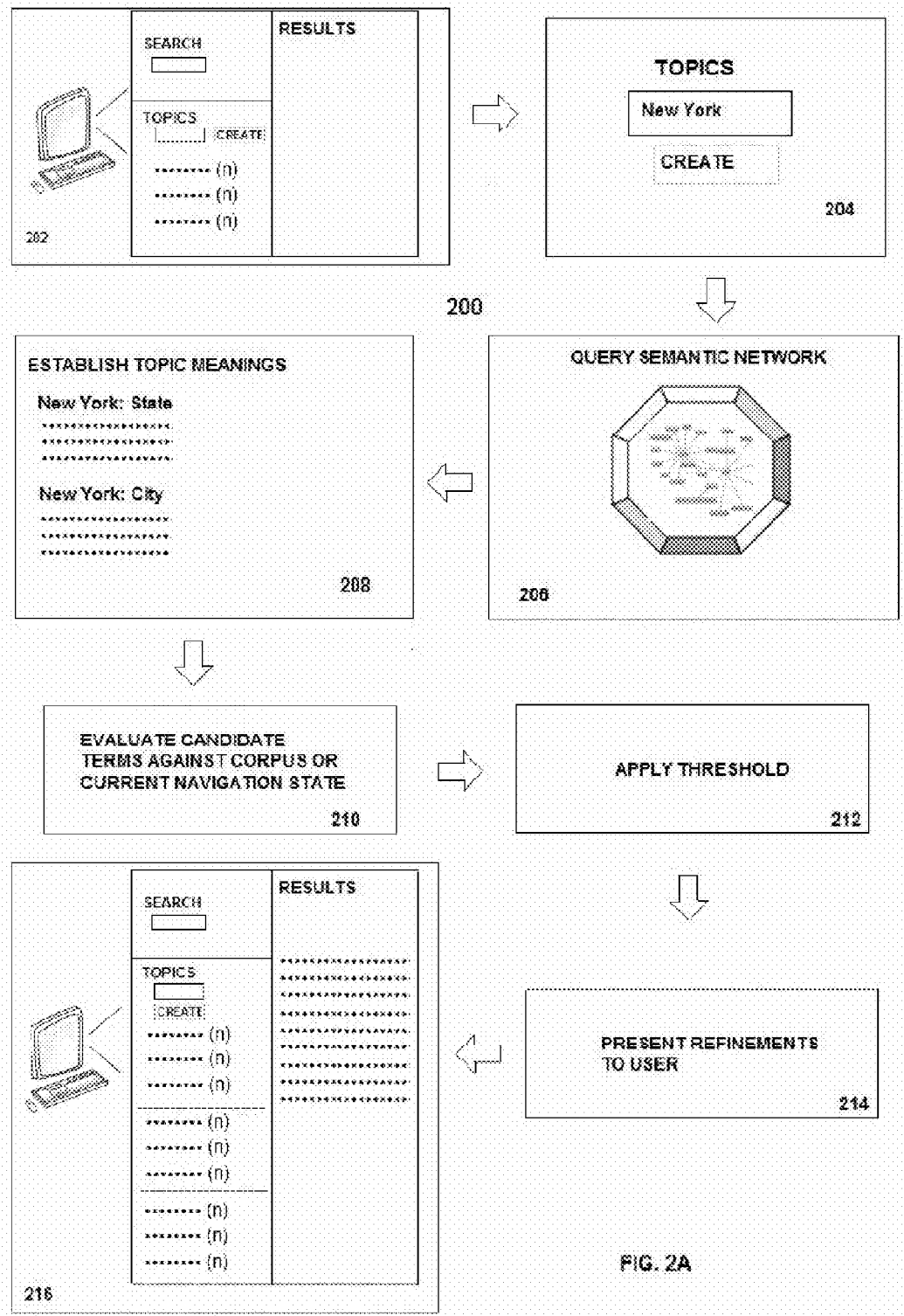

DYNAMIC CREATION OF TOPICAL KEYWORD TAXONOMIES

BACKGROUND

Recent advances in information systems and the digitization of larger amounts of information have led to unprecedented access to sources of information. Although the capability to access an almost unlimited pool of information exists for any person at a computer connected to the Internet, the ability to access that volume of information remains at best limited.

It is understood that more efficient methods are required for permitting human users to interact with these sources of information. Even when the information source is limited to an individual body of knowledge, i.e., a corpus of information, the size of a conventional knowledge base typically presents problems to the ordinary user. Even with specialized corpora the volume of information that a user can access has expanded exponentially. This volume of information typically overwhelms the average user. Given a corpus, a body of information, of a particular format, the conventional user may have significant difficulty in determining what information within the corpus to review and how to proceed to narrow the information accessed within the corpus according to the user's information retrieval need.

Some approaches have sought to facilitate the user experience by providing the user with navigation options based on pregenerated topics. When a knowledge base is created, various topics can be applied to the information contained within the corpus to provide topical navigation options. These topics can be considered enrichments of the underlying data, as they provide easier ways to understand and access the breadth of the knowledge base. These data enrichments provide description of the underlying data and can be used to facilitate navigation or searching. Other approaches have solicited user feedback to improve organization of information. And yet other approaches extract terms from results generated during a user search through a corpus.

SUMMARY

It is realized that conventional systems for facilitating user interaction with a corpus of information have significant drawbacks, including a failure to properly address user intent during navigation and/or searching within a corpus. Further, conventional systems often are limited either to pregenerated ontologies or taxonomies (groups of descriptors) or to terms that are physically present in a set of results presented to the user. These limitations tend to be restricted to terms with high recall (terms that appear in a large number of items in a corpus or in a result set) and may not provide for grouping of such terms in logical and consistent manners. Such terms also might not answer to the user's information retrieval need. Various aspects of the invention seek to address at least some of the shortcomings of prior art systems.

In broad overview, the present invention is directed to systems and methods for improving user interaction with data stored in a corpus. Providing topical dimensions (taxonomies or ontologies) of keywords improves a user's ability to navigate and access any stored information. However, conventional systems that are limited by requiring creation of the taxonomies in advance (usually, during data pre-processing) do not adequately support users. These pregenerated dimensions are inflexible and cannot reflect user intent on an individual basis. Further, pregenerated dimensions may not even suit the particular search intent of a given user. According to one embodiment, a navigation system is provided that accepts a user input term or phrase, a topic, and resolves the topic against a semantic network to determine any senses for the topic. In one example, the semantic network is a computerized information structure that organizes meanings for terms and phrases, and can return those meanings in response to a request. Any terms reflective of those senses or meanings can be used to define a taxonomy for presentation to a user.

According to one aspect, a process of creating topical dimensions for a corpus can be performed on demand. In another aspect, dynamic creation of topical dimensions can occur in response to input and/or incorporate user suggestion. Accepting user suggestion permits taxonomy creation that incorporates user intent directly into the creation of any dimensions. These dimensions can then be accessed by the user to refine searches or navigate within a corpus. In one embodiment, a user can provide a topic seed from which a navigation system can generate a taxonomy based on an input topic. These seeded taxonomies, typically, are more readily understood as the user-provided input into the creation of the refinements presented to the same user. In another embodiment, dynamically created taxonomies are presented to the user in an interactive query/navigation session. The user accesses a corpus of information in a user interface. The user interface displays options for accessing the corpus, which may include a search term box and topics that describe the information in the corpus. During a session, the user can enter topics to create dynamic taxonomies reflective of the user's information retrieval or search intent. These created taxonomies can further reflect the current state of the navigation system within the corpus of information.

According to another aspect, dynamically generated taxonomies can be cached for use in subsequent refinements and further can be presented to other users to improve their interactions with the corpus. In some settings, the corpus itself can be updated with the dynamically generated taxonomies. In other settings, such updates can be conditioned upon a usage threshold, so only taxonomies that are used, for example, some minimum number of times, or in another example with a minimum frequency, are actually used to update the corpus they describe. Such thresholds may alternatively be based on the number of times a particular topic appears in a user-seeded list, the number of times it is selected by a user as a refinement, or other relevance criteria.

According to one aspect of the present invention, a computer implemented method for generating refinements within a corpus is provided. The method comprises receiving a topic from a user in a user interface, generating, dynamically, at least one term associated with the topic, wherein the act of generating the at least one term includes acts of communicating a query to a semantic network based on the topic, receiving the at least one term from the semantic network in response to the query, and presenting automatically to the user in the user interface the at least one term as a selectable refinement in response to receiving the topic from the user entered in the user interface. According to one embodiment of the present invention, the act of receiving the at least one term from the semantic network includes an act of receiving at least one sense of the received topic, and wherein the at least one term corresponds to the at least one sense. According to another embodiment of the invention, the method further comprises an act of comparing the at least one term against a threshold value that identifies informativeness of the at least one term. According to another embodiment of the invention, the method further comprises an act of dynamically determining the threshold value. According to another embodiment of the invention, the threshold value that identifies informativeness of the at least one term includes a value for at least one of precision, recall, f-measure, and a salience metric.

According to one embodiment of the present invention, the act of receiving the at least one term from the semantic network includes an act of receiving at least one candidate term that corresponds to each sense of the at least one sense of the received topic. According to another embodiment of the invention, the method further comprises an act of identifying the at least one term from the at least one candidate term, wherein the act of identifying the at least one term includes acts of evaluating the at least one candidate term against a threshold value that identifies informativeness of the at least one term, and determining that the at least one candidate term meets the threshold value. According to another embodiment of the invention, the act of receiving the at least one term from the semantic network includes receiving a plurality of terms from the semantic network, wherein the plurality of terms correspond to a respective sense of a plurality of senses for the topic. According to another embodiment of the invention, the method further comprises an act of grouping the plurality of terms by the respective sense for each term. According to another embodiment of the invention, the act of identifying at least one sense of the topic from the semantic network includes an act of restricting the identified at least one sense by semantic relationship. According to another embodiment of the invention, the semantic relationship includes at least one of a meronym, holonym, and hyponym. According to another embodiment of the invention, the method further comprises an act of caching the generated at least one term.

According to one embodiment of the present invention, the method further comprises an act of updating the corpus with the at least one term. According to another embodiment of the invention, the method further comprises acts of tracking a usage pattern associated with received topics, and updating the corpus with the at least one term in response to the usage pattern indicating an established user demand. According to another embodiment of the invention, the method further comprises an act of automatically filtering the at least one term retrieved. According to another embodiment of the invention, the method further comprises an act of associating a navigation operation with the at least one term. According to another embodiment of the invention, the act of associating a navigation operation includes an act of associating the at least one term with at least one of a query for the at least one term in the corpus and a transition operation to a set of items within the corpus reflective of the items associated with the at least one term. According to another embodiment of the invention, the method further comprises acts of retrieving a plurality of terms including the at least one term from the semantic network, and filtering, automatically, at least one of the plurality of terms.

According to another aspect of the present invention, a computer-readable medium is provided, which includes instructions that when executed cause a computer system to perform a method for generating refinements within a corpus is provided. According to one embodiment, the computer-readable medium contains instructions that perform the preceding acts of the method for generating refinements within a corpus, individually, separately, or in any combination.

According to one aspect of the present invention, a system for dynamically generating taxonomies is provided. The system comprises a communication component configured to receive a topic from a user input in a user interface on a host computer system, a generation component configured to dynamically generate at least one term associated with the received topic, wherein the generation component is further configured to communicate a query to a semantic network based on the received topic, and receive the at least one term from the semantic network in response to the query, and wherein the communication component is further configured to communicate to the host computer system the at least one term as a selectable refinement displayed in the user interface in response to receiving the topic from the user in the user interface. According to another embodiment of the invention, the received at least one term corresponds to at least one sense of the received topic. According to another embodiment of the invention, the system further comprises an evaluation component configured to compare the at least one term against a threshold value that identifies informativeness of the at least one term. According to another embodiment of the invention, the evaluation component is further configured to dynamically generate the threshold value. According to another embodiment of the invention, the evaluation component calculates for the at least one term a value for at least one of precision, recall, f-measure, and a salience metric. According to another embodiment of the invention, the generation component is further configured to retrieve at least one candidate term that corresponds to each sense of the at least one sense of the topic.

According to one embodiment of the present invention, the evaluation component is further configured to compare the at least one candidate term against a threshold value that identifies informativeness of the at least one term, and present the at least one candidate term as the at least one term in response to a determination that the at least one candidate term meets the threshold value. According to another embodiment of the invention, the generation component is further configured to receive a plurality of terms from the semantic network, wherein the plurality of terms correspond to a respective sense of a plurality of senses for the topic. According to another embodiment of the invention, the generation component is further configured to group the plurality of terms by the respective sense for each term. According to another embodiment of the invention, generation component is configured to restrict the at least one term received by semantic relationship. According to another embodiment of the invention, the semantic relationship includes at least one of a meronym, holonym, and hyponym. According to another embodiment of the invention, the system further comprises a storage component configured to cache the generated at least one term.

According to one embodiment of the present invention, the system further comprises an update component configured to update the corpus with the at least one term. According to another embodiment of the invention, the system further comprises a storage component configured to track usage patterns associated with submitted topics, and update the corpus with the at least one term in response to the usage pattern indicating a predetermined user demand. According to another embodiment of the invention, the system further comprises an evaluation component configured to automatically filter the at least one term retrieved. According to another embodiment of the invention, the generation component is further configured to receive a plurality of terms including the at least one term from the semantic network, and the system further comprises an evaluation component configured to filter, automatically, at least one of the plurality of terms. According to another embodiment of the invention, the generation component is further configured to associate a navigation operation with the at least one term. According to another embodiment of the invention, the generation component is further configured to associate the at least one term with at least one of a query for the at least one term in the corpus and a transition operation to a set of items within the corpus reflective of the items associated with the at least one term.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIG. 2A is a flow diagram of an example process for dynamically generating taxonomies, according to aspects of the invention;

DETAILED DESCRIPTION

Figure 1:
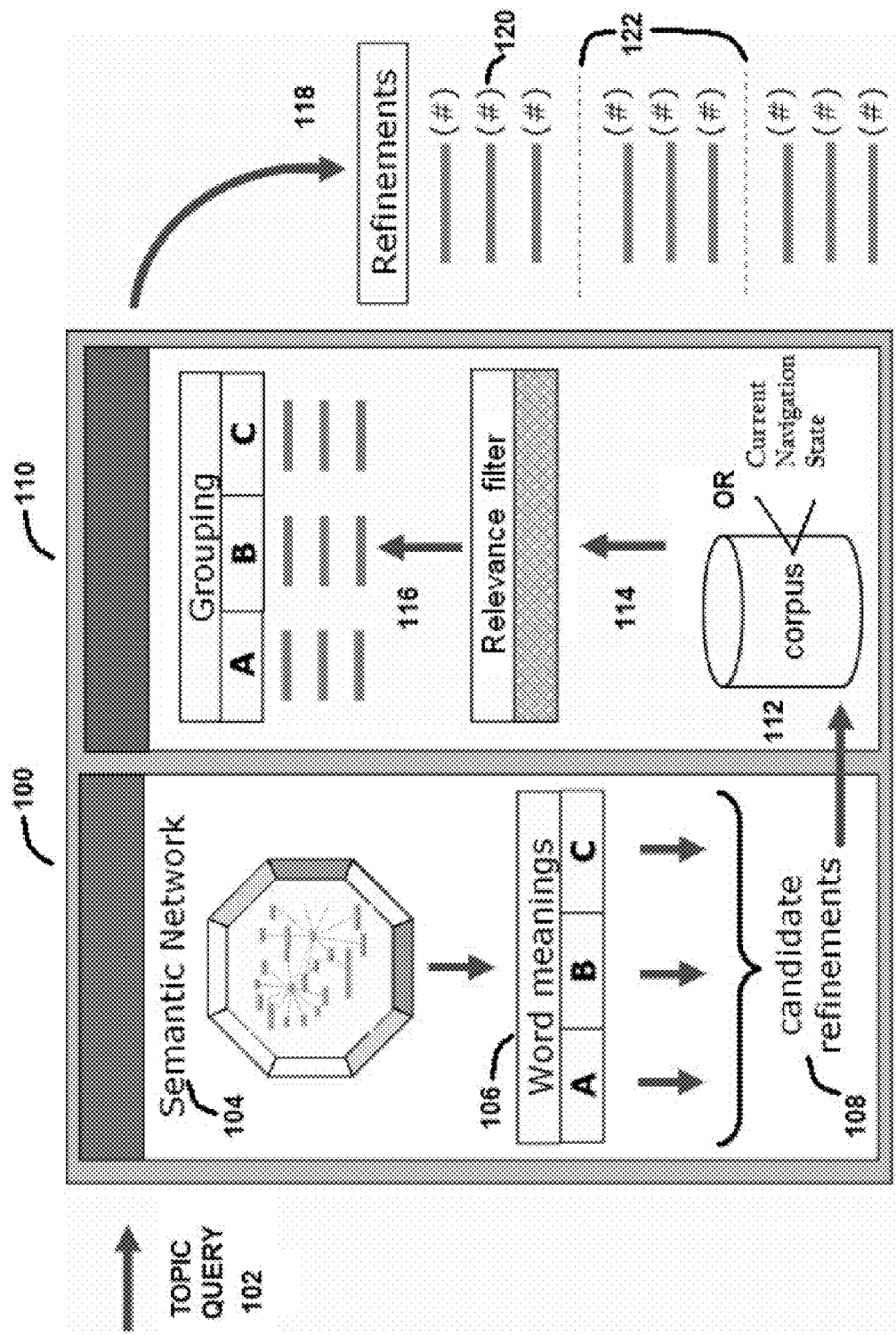
FIG. 1 is a block diagram of an example system architecture according to aspects of the invention.

According to one aspect, a method for dynamic generation of taxonomies includes querying a semantic network for terms related to an input topic to generate candidate refinements. Candidate refinements can be evaluated by computing informativeness measures of each candidate against the current corpus. These operations can be performed automatically by a navigation system in response to user input and the generated taxonomy can be used in the context of refining an interactive query. For example, a user can access a corpus of documents presented in a window of a user interface. Typically, the user interface presents the user with options for refining a state or view of the corpus. For example a user can enter a query to return results from within the corpus. In another example, topical dimensions can also be presented to the user that describe or are related to the contents of the corpus. In some settings, the topical dimensions can provide to the user an indication of a number of documents associated with a particular option. Upon selection by the user, a navigation system can be configured to bring the user to another state reflecting the documents associated with the particular option (e.g. a topical dimension). In different setting, the topical dimensions could be used to present a summary of the navigation state (e.g., as a tag cloud).

In conventional navigation systems topical dimension can reflect pregenerated descriptors. As discussed, pregenerated dimensions oftentimes fail to address the particular needs of the user and may not reflect, for example, the current navigation state. According to one embodiment, the user is presented with a text box for inputting a topic the user wishes to employ in navigating and/or refining within the corpus. In one embodiment, the system responds to an input topic by determining the senses of the input topic. A sense for a term/topic refers to a meaning for a term or topic. For example, the term java is associated with multiple senses: an island in Indonesia; a programming language; and coffee. In some embodiments, the system queries an external semantic network to determine senses for a given topic. In other embodiments, an internal semantic network is employed. In other embodiments, the semantic network can contain related terms without sense information.

Stated generally, a semantic network is a computerized information structure which represents semantic relations among concepts. Semantic networks are implemented as a form of knowledge representation. For example, semantic networks can be represented as directed or undirected graphs consisting of vertices and edges, which are representative of concepts in a knowledge base. A corpus of information contains concepts and relationships that can be searched and/or navigated to obtain the information contained therein. According to some embodiments, a navigations system queries a semantic network that is a computer implemented representation of the senses/meanings of terms and/or phrases. The semantic network typically resides on a computing entity configured to accept requests over a communication network, for example the Internet, and respond to the request with senses for the requested information. The semantic network implemented can be installed on a number of architectures, and can be hosted remotely or locally to a navigation system. For example, a navigation system, the corpus of information, and the semantic network employed can be connected via an intranet network. Alternatively, the multiple components of the system can be installed on the same system using intra and inter system communications. The invention should not be viewed as limited to any particular computer architecture, as the semantic network can reside on the same system providing for navigation within a corpus of information, and the software and/or hardware elements that provide the semantic network services can be integrated with the software and/or hardware elements that provide for navigation services. In some embodiments, the semantic network can reside on a separate system or systems that can include distributed computing platforms, can have client server architectures, or can be installed on virtualized environments, to provide some examples.

Shown in FIG. 1 is a block diagram of an example system architecture 100. At 102, a topic query is received by a semantic network 104. The topic query can include terms and/or phrases entered by a user. The semantic network processes the received query to determine any meanings for the words or phrases received. At 106, the semantic network resolves the received topic query into the senses corresponding to the topic, since a topic query can be associated with multiple meanings or senses. The semantic network organizes various terms and phrases into sets of synonyms typically referred to as synonym sets or synsets. Semantic networks can provide definitions for the terms and phrases and record the semantic relations between synonym sets.

According to one embodiment, three kinds of semantic relations are used to generate related terms: meronyms—a word that names a part of a larger whole (topic); 'brim' and 'crown' are meronyms of 'hat'; holonyms—a word that names the whole of which a given topic term is a part; 'hat' is a holonym for 'brim' and 'crown'; and hyponyms—a word that is more specific than a given word (topic); 'lily' and 'violet' are hyponyms of 'flower.' In other embodiments, any available semantic relation can be used to develop a set of related terms. These related terms are representative of at least one, and often more than one, meaning returned in response to the query. The set of related terms generated from the semantic network can be communicated to the navigation system 110, or alternatively an evaluation system that operates in conjunction with the navigation system 110. At 112, the system 110 can determine whether to evaluate the candidate refinements against a current state or against the entire corpus. In some embodiments, default behavior is established so the system either uses the entire corpus or the current state automatically.

At 114, each candidate term is checked to determine that an informativeness measure (e.g. precision, recall, f-measure or combination thereof) is within acceptable limits. Precision is used to measure the number of relevant items retrieved compared against the total number of items retrieved, while recall measures the number of relevant items retrieved against the total number of relevant items that exists within a corpus. In a typical setting, precision and recall often have an inverse relationship: maximizing one may result in the reduction of the other. F-measure refers to the calculation of the harmonic mean of precision and recall and provides additional avenues for fine tuning the balance between precision and recall. Various weights can be used with the generation of an f-measure value to favor precision over recall or vice versa. The weighting can be defined based on a desired system configuration. System configurations can be established to determine the acceptable limits for the system. The system configuration can specify a minimum precision, recall, and/or f-measure. For example, a candidate term's recall can be computed as the fraction of all documents in the corpus that contain this term. A candidate term's precision can be computed as the fraction of the corpus documents that contain the original topic query and also contain the candidate term. The filtering can trim the low-scoring candidate terms (as being too rare) or high-scoring candidate terms (as being redundant). In addition, other filters can also be employed. For example, candidate terms may be filtered if they do not provide meaningful refinement. If the candidate generates purely random results or purely generic results, they are typically not thought of as useful and can be filtered. Similarly, a salience metric may be used to assess the quality of the result set. Co-pending U.S. patent application Ser. No. 12/146,185, titled "SYSTEM AND METHOD FOR MEASURING THE QUALITY OF DOCUMENT SETS" filed on Jun. 25, 2008, describes systems and methods for calculating salience metrics and is incorporated herein by reference in its entirety. Relevancy metrics and/or frequency analysis can also be used to evaluate candidates, among other options.

For each candidate term that passes this selection 116, the candidate term is converted into a refinement 118 with an associated action. The associated action can include, for example, a text search on a term from the extracted terms dimension. In another example, selection of the refinement can transition the navigation system to another state within the corpus reflective of the information associated with the topical dimension. The refinements at 118 are presented by the system grouped according to their semantic meaning. The system can provide a visual indicator that will convey to a user the grouping by meaning, for example at 122 shown as a dashed line. Each refinement can also be associated with a number of associated items within the corpus, for example at 120.

In some examples, a semantic network is configured to provide related terms for any identified senses returned for a topic query. In some settings, where multiple senses are identified, for example in reference to java, related terms for each sense can be retrieved. In another embodiment, a system can be configured to retrieve further senses and further related terms for any of the initially returned senses and/or related terms. The results can be presented as a hierarchy of topical dimensions with multiple layers of terms and meanings to present as refinements.

According to one embodiment, the identified senses establish word meanings or phrases associated with the user input topic. The word meanings are used to determine related terms. The terms identified as related to a given meaning can be processed further by a navigation or an evaluation system. For example, the terms identified can be treated by the system as candidates for subsequent presentation. According to another embodiment, the system evaluates any candidate terms to determine if the candidate term is a useful refinement. The determination of usefulness can be made against the entire corpus or against a subset of the corpus, including a subset already selected by previous user action. In one example, a navigation system can also determine whether a candidate is useful in the context of a current navigation state. For example, a user may have presented queries within the navigation system that narrowed the current navigation state to a subset of items with the corpus, and the candidate determination may be made in the context of that subset of items. Alternatively, the user may have selected navigation options which refined the current navigation state for the user. Regardless of how the system derived the current navigation state, the system can respond to the user entered topic to generate a taxonomy relevant and useful in the context of the current navigation state.

Senses identified in response to the user entered topic can be filtered against the current state to return only the terms relevant to the present state. For example, a user searching for $20^{th}$ century literature entering the topic "ground zero" would not receive any of the related terms for ground zero as it relates to the location of the World Trade Center. Rather the system could return a sense for the topic "ground zero" as it related to, for example, the locations of the atomic detonations in Hiroshima and Nagasaki and could provide terms related to that particular sense. Additional filtering can be performed on the basis of precision, recall, and f-measure. In some embodiments, other relevancy metrics can be used, including, for example, distance metrics and/or salience metrics. For each sense and/or its related terms, a value can be calculated for its precision and recall. For example, the system can be configured with a threshold value for each measure, and only if the threshold is satisfied will a term be presented to a user as an option. In some embodiments, the evaluation can occur against either precision or recall. In others the evaluation can be made against both. In yet others, f-measure can also be used to maximize both precision and recall. Various weights can be used with the generation of an f-measure value to favor precision over recall or vice versa, depending upon system configuration.

For candidate terms that meet any applicable threshold, the system can provide the candidate terms as refinement options within a user interface presented to the user. Candidate terms can be grouped according to their senses prior to display. In addition, candidate terms can define a hierarchical arrangement. The user interface can be configured to display the hierarchical taxonomy, or in some embodiments, selection of a term in the hierarchy will trigger the system to present the next level of the hierarchy. Each level of a hierarchy can be arranged according to the senses the terms represent. An example user interface can provide a visual indication of terms grouped by sense.

According to another aspect of the invention, a guided navigation system is provided for accessing a corpus of information stored on a computer system. Embodiments of the invention can be implemented in conjunction with collections of any type of material stored digitally, for example in a database. The materials could include text documents, images, web pages, sound clips, etc. In some embodiments, the corpus includes text documents. The user can enter a topic in a user interface of the system, and the system responds with a custom taxonomy in that interactive session. For example, the user can enter a term or phrase (e.g. a topic) into a text box and the system can respond with refinements that are the result of a query of a semantic network for the entered term or phrase. In another example, the system determines any sense for the term or phrase entered by the user, accesses any related terms for each of the sense and presents to the user the related terms as refinement options. In yet another example, the related terms can be filtered against their informativeness value to determine whether they are presented to the user. In some embodiments, the related terms are grouped according to their senses. The presentation of the related terms can provide a visual indicator of the groupings where multiple related terms are being displayed. Further, related terms can define hierarchies. A user interface of the system can present the entire hierarchy of terms and any grouping of the senses for the terms. In another embodiment, the hierarchy of terms can be presented as individual levels, and selection of a particular term results in presentation of another level of the hierarchy.

A user can employ the related terms presented as refinement options for navigating within a corpus or for further refining a result set derived from the corpus. According to one embodiment, the refinements presented to the user contain terms that are related to the input topic, and are useful refinements for the particular corpus (or current navigation state). In some embodiments, useful refinements are identified by the system automatically from candidate refinement options. For example, the related terms can be evaluated as candidate refinement options for informativeness and their usefulness in the context of the system's current state. Candidate refinements that do not meet a predefined threshold for informativeness can be eliminated, and the remaining refinements presented to the user.

Shown in FIG. 2A is an example process for dynamically generating taxonomies in response to user input. Process 200 begins with a user accessing a corpus of information. In this example, the corpus includes text documents. The corpus may include structured or unstructured data or combinations of both. The user begins their interaction with the corpus at 200, by navigating to a search interface displayed on a host computer through a server process. Typically the user accesses the search interface using a browser, and can employ any one of the commonly known browser programs (Internet Explorer, Firefox, Chrome, etc.) to access a publicly accessible web page that renders the user interface. Alternatively, a browser may access a secure page or one that is not publicly accessible, and may also access internally hosted sites. Accessing the search interface begins an interactive search session for the user. In one embodiment, the navigation system provides for display of the information within the corpus, a search box for executing queries against the corpus, and the system may optionally provide for topics organizing the information within the corpus. An example display of topical dimensions is illustrated in FIG. 3 at 302 for "ocean" and its related terms. The navigation system is configured to accept a topic entered by the user in the user interface. For example a text box can be displayed, for inputting terms or phrase the user wished to employ in the interaction session. For example, the user can enter "New York" as a potential topic at 204. The navigation system presents a query to a semantic network to resolve any semantic meanings for "New York" at 206. The semantic network identifies any meaning available for the terms "New York," and retrieves terms related to the identified meanings at 208. In this example, the semantic network disambiguates the topic "New York" into two meanings: New York as a state; and New York as a city. The semantic network retrieves the terms related to those meanings at 208. At 210, the navigation system evaluates the related terms as candidate terms. The system can be configured to evaluate the candidate terms against the entire corpus, against the current state, or against an additional data source. Additional data sources can include whitelists or blacklists, and in other examples, additional knowledge bases.

In one particular example, during evaluation each candidate term is used as the basis of a query executed against the corpus. The results of the query are used to determine a precision measure for a query based on the candidate term. Additionally the number of documents or items within the corpus related to that term can be stored by the navigation system for subsequent presentation to the user, if desired. The precision measure is evaluated against a predetermined threshold at 210. If the candidate's precision measure does not meet the threshold it is discarded. In another example, the results of the query are used to determine a recall measure associated with the term. The recall measure is evaluated against a predetermined threshold at 210. If the candidate's recall measure does not meet the threshold it is discarded. In yet another example, the results of the query are used to determine an f-measure associated with the candidate term. If the candidate's f-measure does not meet the threshold, the candidate is discarded at 210. In other examples, the system can calculate and evaluate all three measures. In some settings calculation are performed serially and in others the calculations can be performed collectively, concurrently, and/or simultaneously. In other examples, other relevancy metrics can be employed and can include, for example, distance calculations to determine if a threshold for informativeness is satisfied.

Any candidate terms remaining after evaluation can be presented to the user as refinement options at 212. The dynamically generated refinement options are shown in the user interface at 214 and can be used by the user in the present search session. Typically, candidate terms remaining after threshold evaluation(s) are converted into refinement options by associating an action with each term or phrase. The associated actions can include, for example, a text search executed in response to selection of the refinement, and can include defining a navigation state within the corpus associated with the term. Other actions can also be associated with candidate terms before presenting them as refinement options.

Shown in FIG. 3 at 310 is an example display in a user interface showing "new york" as a topic and grouping the refinement options according to the two senses retrieved from the semantic network at 312 and 314.

In some settings, the evaluation of candidate terms can be used to generate frequency information for items within the corpus associated with the candidate terms. The frequency information can be combined with the candidate term when it is provided to the user as a refinement, giving an indication to the user how many items are associated with the refinement prior to selecting it. Referring to FIG. 3, shown at 304 is a dynamically generated taxonomy created in response to an input topic "London." At 304, 16 related terms are displayed. For each of the terms displayed provided in parenthesis are the number of items in the corpus associated with the term, for example at 306. The number may reflect the number of items with reference to the present navigation state, and alternatively may reflect the number of items in the entire corpus.

A user may decide that the particular refinement options are not useful to the user. In some embodiments, the user interface is configured to permit deletion of a created taxonomy. At 308, an "x" is displayed next to the topic and the refinements presented. Upon selection the system can be configured to remove the selected topic and refinement options from the user display. Information associated with the system's current navigation state, and information that the present refinements were found not to be helpful can be stored and evaluated for user's usage patterns.

Figure 2B:
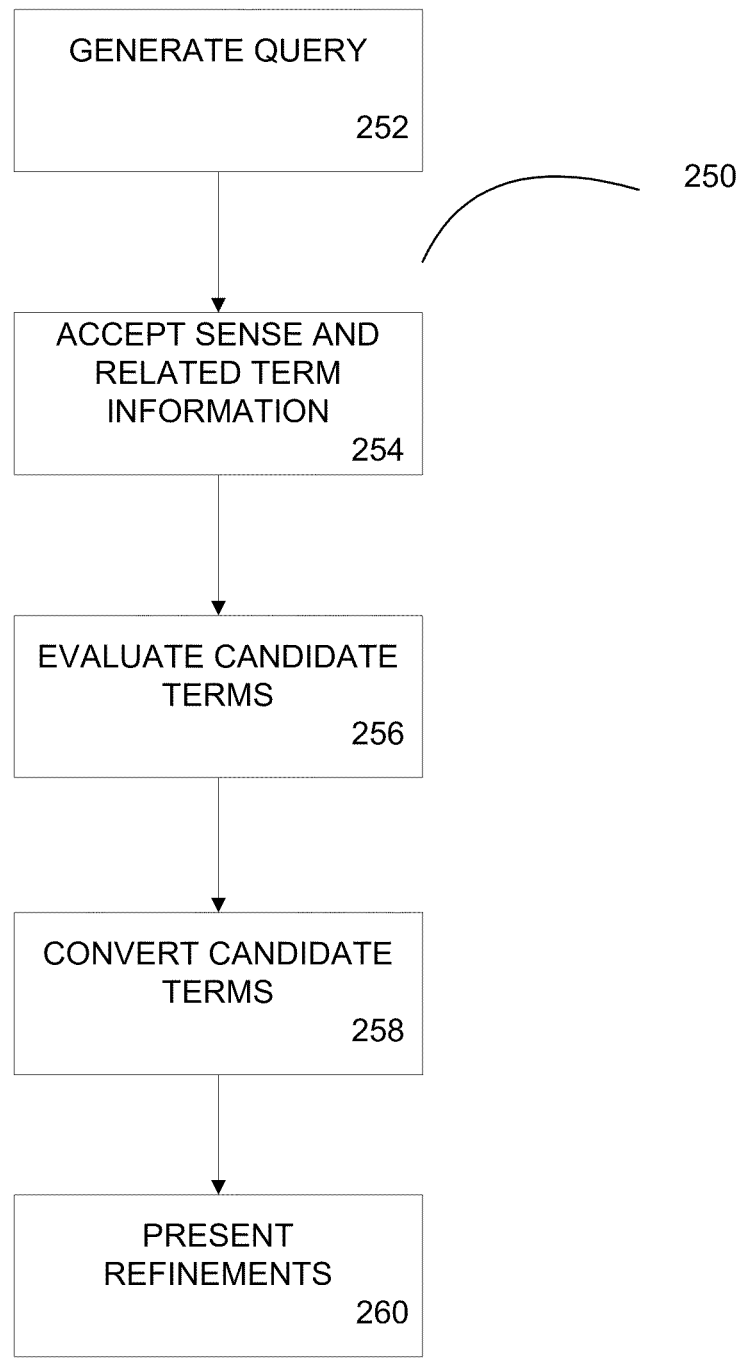
FIG. 2B is a flow diagram of an example process for dynamically generating taxonomies, according to aspects of the invention.
Figure 3:
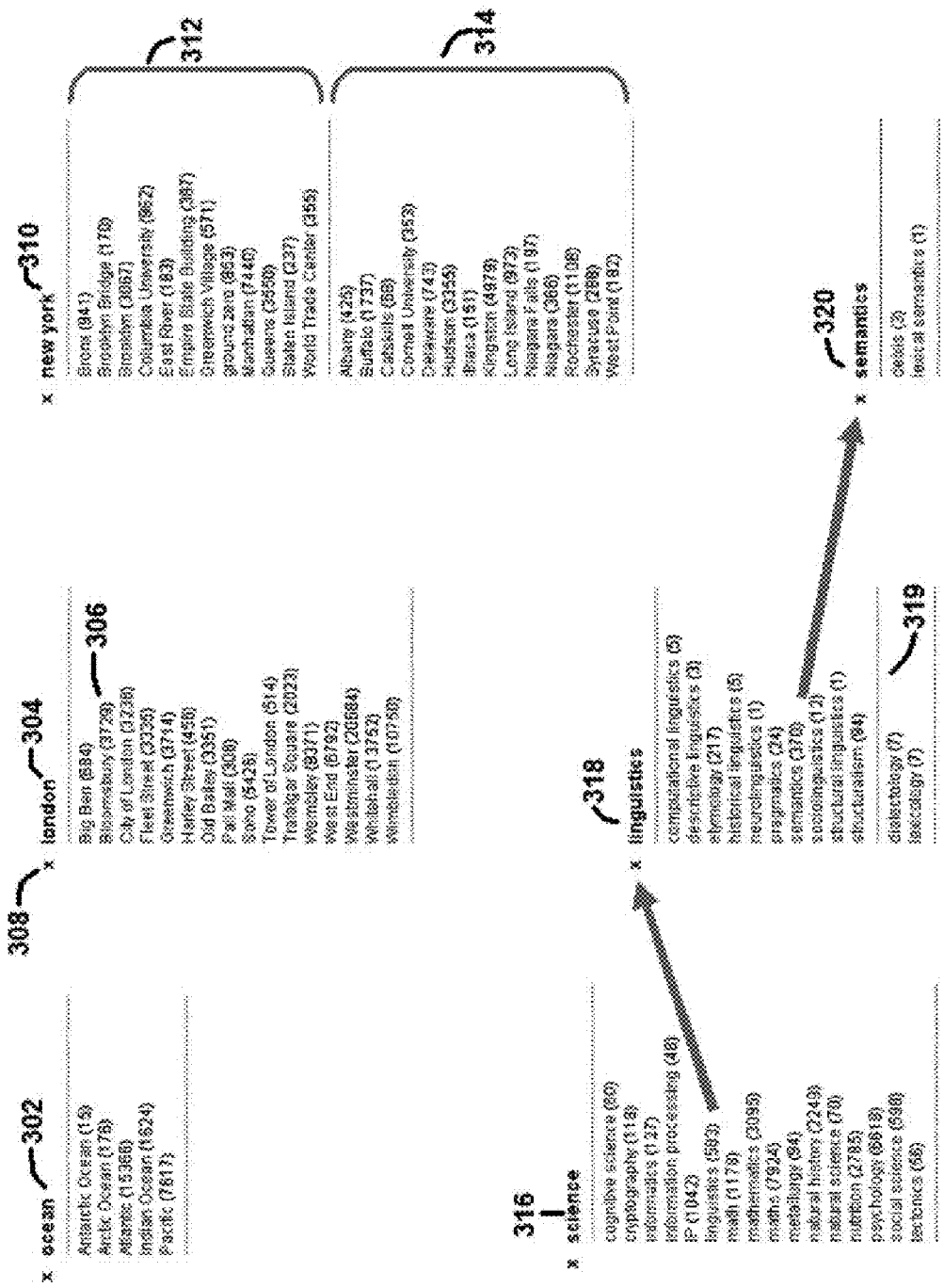
FIG. 3 illustrates example presentations of taxonomies displayed to a user in a user interface, according to aspects of the invention.

Shown in FIG. 2B, is an example process 250 performed by a navigation system coupled to a semantic network. In one embodiment, the semantic network employed is the well known WordNet Semantic network. WordNet is a lexical database of English words. Within WordNet, nouns, verbs, adjectives, and adverbs are grouped into sets of cognitive synonyms (synsets), each expressing a distinct concept. Synsets are interlinked by means of conceptual-semantic and lexical relations. The resulting network of meaningfully related words and concepts can be navigated and/or queried to return senses and related terms. Process 250 illustrates some of the operations performed by the navigation system during taxonomy creation. At 252, the navigation system generates a query to execute against the semantic network based on an input topic. At 254, the navigation system accepts sense and related term information from the semantic network. At 256, the navigation system and more particularly an evaluation component of the navigation system evaluates the senses and related terms as candidate terms to use for refinements within the navigation system. Typically, candidate terms are evaluated for usefulness and relevancy. As discussed herein, the evaluation may include threshold analysis of informativeness measures. In addition, the senses associated with the candidate terms can be evaluated against a current navigation state to determine relevancy. Candidate terms that are useful and relevant are converted into refinements at 258. Conversion into a refinement can include association of the candidate term with an action, for example a query based on the term, or a navigation operation to material within a corpus related to the term. The navigation system then presents the associated refinements to host computer accessing the navigation system at 260.

In one embodiment, the system creates such refinements by querying a semantic network and retrieving, for the given term, its sense(s), and for each sense, related terms. The identification of the related terms for all or some of the topic's senses provides the candidate refinements. In some settings, the candidates can be presented to the user without evaluating their usefulness. In other settings, the candidates can be filtered to eliminate purely random candidates and/or generic candidates.

Different senses of any topic term in the semantic network, as well as different types of term relationships, give rise to different groups of refinement candidates. In one example, the system generates groups of refinement candidates based on any one or more of the senses of a topic term, the relationships between terms, the senses of any related terms, and the relationships between related terms and their senses. In some settings, generated taxonomies can be presented as a hierarchy of related terms and topics. Shown for example in FIG. 4 at 316 is a topic "science." As shown, any one of the related terms can also be associated with its own set of related terms. At 318, "linguistics" is provided as a topic with two senses for its related terms. The senses for the topic "linguistics" are indicated by dashed line 319. Any hierarchy can have multiple levels of topics and related terms. At 320, shown is the taxonomy for the topic "semantics".

According to one aspect, a navigation system caches the dynamically created taxonomy for efficiency in processing subsequent refinement queries. In some implementations, the system can store the dynamically created taxonomies as an update to the corpus itself. Storing dynamically created taxonomies extends the knowledge base by directly capturing actual user demand. In one alternative, the system can monitor usage patterns and update the corpus with dynamically created taxonomies where a usage threshold is met.

Figure 4:
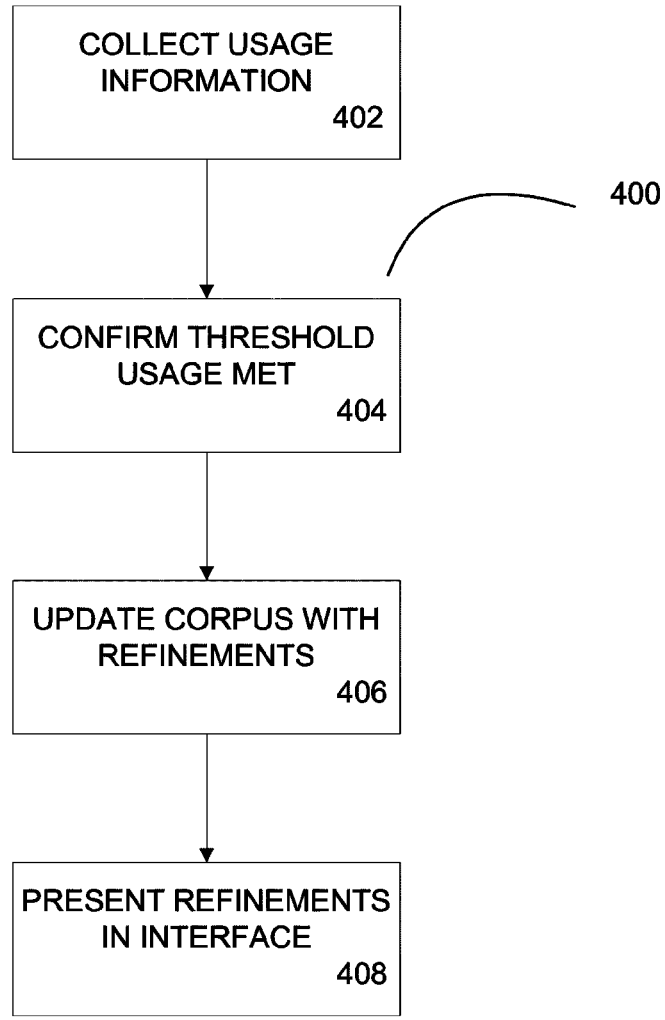
FIG. 4 is a flow diagram of an example process for updating a corpus with generated taxonomies, according to aspects of the invention.

In one example process 400, shown in FIG. 4, usage data is collected by the navigation system at 402. Specifically, the system can track information on actual usage related to dynamically generated refinements across a plurality of users. In one example, the usage data can track selection of a particular refinement on a per user basis. In another example, the system also tracks what topics are entered by users and any taxonomies created as a result of the entered topics. The system can evaluate the topics entered and any overlap or similarity between dynamically generated taxonomies. In some settings, dynamically generated taxonomies are cached for subsequent use. The system can also provide for longer term storage of these dynamically generated taxonomies for continued analysis and, potentially, to use as an update to the corpus of information itself.

At 404, any collected usage data can be evaluated against a predetermined threshold. The threshold may be set by a system operator or determined by the system directly. In some examples, the threshold is configured to insure a minimum usage of refinements prior to updating the corpus of information with the refinements options. Once the update is executed, the refinement options become available to all users accessing the corpus. The usage threshold can establish a minimum number of actual uses for a refinement. In some embodiments, the threshold establishes a minimum number of topic inputs that result in the refinement options. Other thresholds can be employed to insure that a tracked pattern of use establishes some minimum level of activity associated with a particular refinement. In other embodiments, tracking and updating can occur with respect to entire taxonomies. Additionally, statistical analysis can performed over time to refine any threshold for evaluating use. In particular, the threshold can be modified to further restrict updates if large numbers of refinements and/or taxonomies qualify for the updating process. In one alternative, the threshold can be relaxed if little or no updating occurs.

At 406, a corpus of information is updated to reflect the refinement options created in response to user input. The updates to the corpus can be presented as refinements that can be selected in a user interface during a search session. At 408, the refinement options are presented to any user who accesses the corpus after the update.

Figure 5:
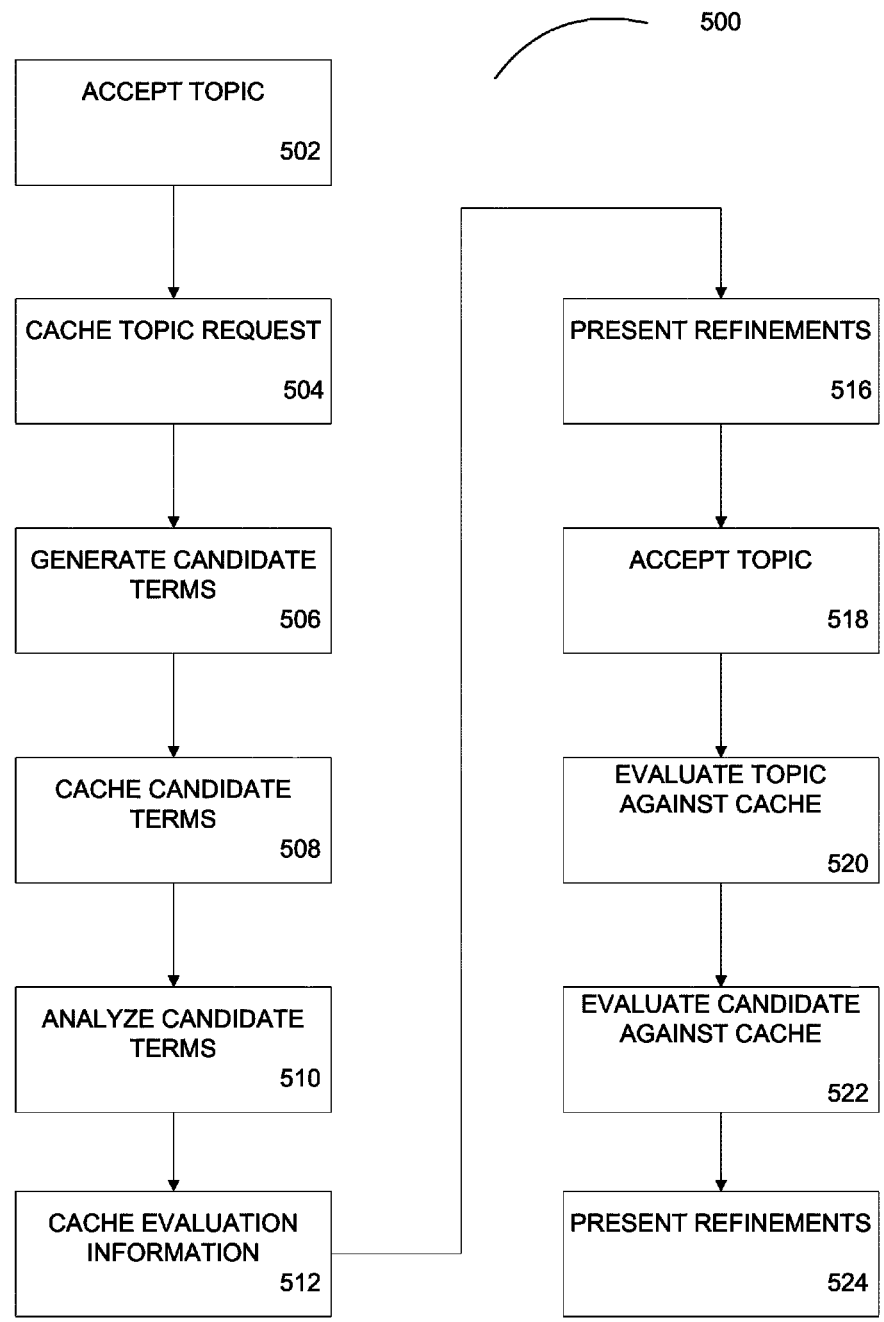
FIG. 5 is a flow diagram of an example process for caching refinement information, according to aspects of the invention.

In another example process, 500, shown in FIG. 5, a process for caching refinement information is shown. A navigation system caches information generated during refinement creation and presentation to reduce the computational burden on subsequent operations. At 502, the system accepts a topic entered by a user. The input topic is cached by the system at 504. At 506, the input topic is used to create candidate refinements. As discussed herein, the act of generating candidate refinements can proceed by querying a semantic network to determine senses and related terms for an input topic. The navigation system can also be configured to cache any identified sense and any related terms returned to the navigation system at 508. At 510, the system evaluates the candidate terms to determine if they are useful and relevant refinement options. The results of the candidate analysis are cached at 512. Optionally, the system can also cache information related to the current navigation state of the system at the time the semantic information is retrieved and evaluated at 514. The current state information can be associated with any of the cached information to permit more refined analysis of when cached information can be used instead of requiring, for example candidate analysis at 510. At 516, the user is presented with refinement options based on the candidate terms that met the evaluation for informativeness. At 518, the navigation system accepts a subsequent request for generation of refinements based on a user input topic. In some examples, this can be the same user who input a topic receiving responsive refinement options in one interactive query session. In other examples, the cached information is made available to a plurality of users by the navigation system.

At 520, the input topic can be evaluated against cached information, and if the present topic matches a cached topic to a sufficient degree, the cached results of dynamic refinement generation can be provided without use of the semantic network or subsequent evaluation. If the present topic does not match against any cached information, the system retrieves the senses and related terms from a semantic network. The individual senses and any related terms can be evaluated against cached information at 522. Matching present candidate terms against cached terms permits the navigation system to used cached information rather than performing an evaluation of the candidate term. For example, if the candidate term was discarded under previous analysis as not meeting an informativeness threshold, the present candidate can be eliminated without requiring analysis of its informativeness. In another example, present candidates can be matched against cached terms based on similarity rather than exact matching. In some settings, sense information is evaluated when determining if a cached term matches a present candidate. In addition, cached state information can be used when evaluating candidate terms against cached terms to determine if they match or are relevant to the present refinement generation topic. Cached navigation state information can influence whether topic matching is present. For example at 520, the topic "ground zero" entered in the context of searching on terrorism may not match the same topic "ground zero" entered in the context of searches on mid-20$^{th}$ century literature based on analysis of state information. In some embodiments, the senses of the terms are used to identify appropriate matches in addition or as an alternative to state information. At 524, any cached refinements and any refinements presently generated can be displayed to a user.

According to one embodiment, a navigation system is provided having at least one of the following elements:

A user interactive search session
User entered topic information
Dynamic taxonomy generation and return during the user's interactive session
Further taxonomy creation and refinements generation based on terms/phrases returned from a semantic network
User entered topic or navigation option used to define a concept "seed" (outside a search or query)
Concept seed used to generate potential refinements from a semantic network
Retrieval of sense information and/or meaning
Retrieval of related terms for identified senses
Retrieval of terms related to a topic
Retrieval of senses for the terms related to the topic
Candidate terms grouped and analyzed for informativeness
Creation and/or storage of enriched data based on actual user demand or need Various embodiments according to the present invention may be implemented on one or more computer systems. These computer systems may be, for example, general-purpose computers such as those based on Intel Atom, Core, or PENTIUM-type processor, IBM PowerPC, AMD Athlon or Opteron, Sun UltraSPARC, or any other type of processor. It should be appreciated that one or more of any type computer system may be used to dynamically generate taxonomies of refinement options in response to entered words or phrases, communicate and/or display computer interfaces for navigation and querying a corpus of information, host a semantic network, respond with senses and/or meanings for an input topic, respond with related terms for an input topic according to various embodiments of the invention. Further, the system may be located on a single computer or may be distributed among a plurality of computers attached by a communications network.

A general-purpose computer system according to one embodiment of the invention is configured to perform any of the described operations and/or algorithms, including but not limited to providing for display of a user interface to navigate and/or search a corpus of information, provide access to a database storing a corpus of information, receive user entered topics, generate queries against a semantic network in response to user entered topics, provide access to a semantic network, host a semantic network, retrieve terms related to an input topic, determine senses for an input topic, evaluate terms for informativeness, determine and/or track state information in a corpus of information, evaluate terms against state information, calculating at least one of precision, recall, and f-measure for a candidate term, defining thresholds for informativeness, applying the threshold against candidate terms, generating taxonomies from candidate terms, caching information associated with taxonomy generation, using cached taxonomy information to improve processing, and updating a corpus of information using generated taxonomies, among other options. It should be appreciated, however, that the system may perform other operations and/or algorithms, including grouping candidate terms and/or refinement options by sense, generating hierarchical taxonomies, presenting refinement options to users in user interfaces, generating information associated with refinements options for presentation, etc. The operations and/or algorithms described herein can also be encoded as software executing on hardware that define a processing component, that can define portions of a general purpose computer, reside on an individual general purpose computer, and/or reside on multiple general purpose computers.

Figure 6:
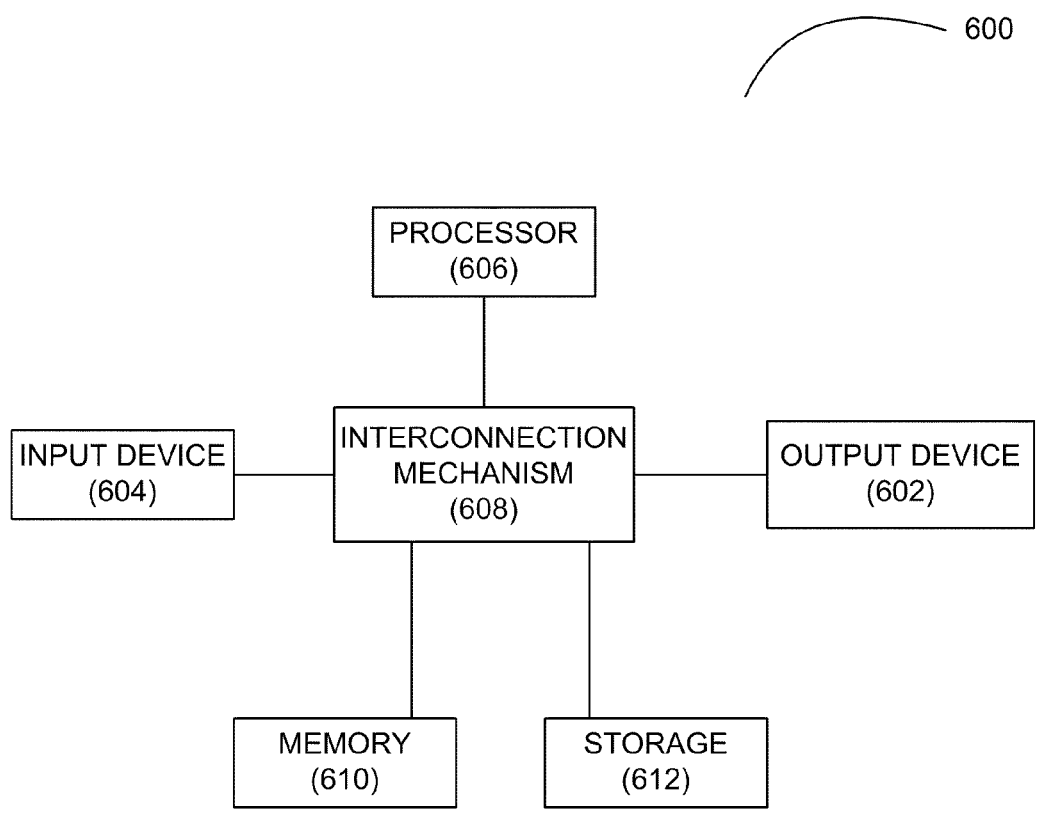
FIG. 6 is a block diagram of an example system for dynamically generating taxonomies for a corpus of information, according to aspects of the invention.

FIG. 6 shows a block diagram of a general-purpose computer system 600 in which various aspects of the present invention can be practiced. For example, various aspects of the invention can be implemented as specialized software executing in one or more computer systems including general-purpose computer systems 804, 806, and 808 communicating over network 802 shown in FIG. 8. Computer system 600 may include a processor 606 connected to one or more memory devices 610, such as a disk drive, memory, or other device for storing data. Memory 610 is typically used for storing programs and data during operation of the computer system 600. Components of computer system 600 can be coupled by an interconnection mechanism 608, which may include one or more busses (e.g., between components that are integrated within a same machine) and/or a network (e.g., between components that reside on separate discrete machines). The interconnection mechanism enables communications (e.g., data, instructions) to be exchanged between system components of system 600.

Computer system 600 may also include one or more input/output (I/O) devices 604, for example, a keyboard, mouse, trackball, microphone, touch screen, a printing device, display screen, speaker, etc. Storage 612, typically includes a computer readable and writeable nonvolatile recording medium in which signals are stored that define a program to be executed by the processor or information stored on or in the medium to be processed by the program.

Figure 7:
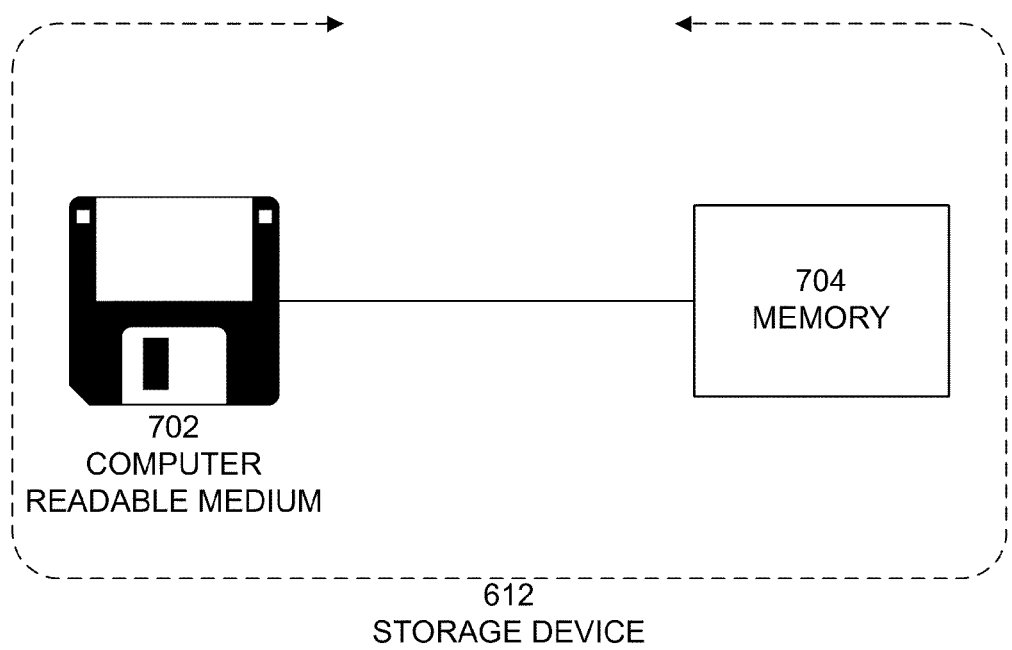
FIG. 7 is a block diagram of an example system for dynamically generating taxonomies for a corpus of information, according to aspects of the invention.

The medium may, for example, be a disk 702 or flash memory as shown in FIG. 7. Typically, in operation, the processor causes data to be read from the nonvolatile recording medium into another memory 704 that allows for faster access to the information by the processor than does the medium. This memory is typically a volatile, random access memory such as a dynamic random access memory (DRAM) or static memory (SRAM).

Referring again to FIG. 6, the memory can be located in storage 612 as shown, or in memory system 610. The processor 606 generally manipulates the data within the memory 610, and then copies the data to the medium associated with storage 612 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention can be implemented in software, hardware or firmware, or any combination thereof. Although computer system 600 is shown by way of example as one type of computer system upon which various aspects of the invention can be practiced, it should be appreciated that aspects of the invention are not limited to being implemented on the computer system as shown in FIG. 6. Various aspects of the invention can be practiced on one or more computers having a different architectures or components than that shown in FIG. 6.

It should be appreciated that the invention is not limited to executing on any particular system or group of systems. Also, it should be appreciated that the invention is not limited to any particular distributed architecture, network, or communication protocol.

Various embodiments of the invention can be programmed using an object-oriented programming language, such as Java, C++, Ada, or C# (C-Sharp). Other object-oriented programming languages may also be used. Alternatively, functional, scripting, and/or logical programming languages can be used. Various aspects of the invention can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the invention can be implemented as programmed or non-programmed elements, or any combination thereof.

Various aspects of this invention can be implemented by one or more systems similar to system 600. For instance, the system can be a distributed system (e.g., client server, multi-tier system) comprising multiple general-purpose computer systems. In one example, the system includes software processes executing on a system associated with a user who enters a topic request during an interactive search session, a navigation system that receives the topic, generates a query to perform on a semantic network based on the topic, an evaluation component that evaluates senses and terms returned by the semantic network, and a presentation component that generates a display for the user including the senses and terms that meet evaluation criteria. These systems may permit the end users to access content in data locally or may permit remote access to content in data, the end users, for example, can participate in interactive review and refinement of information within a corpus, and can generate and customize taxonomies at will during the interactive session, as discussed above, among other operations.

There can be other computer systems that perform functions such as receiving and responding to topic queries with semantic information, hosting semantic networks, tracking usage patterns associated with dynamic taxonomies, updating corpora of information with generated taxonomies, among other functions. These systems can be distributed among a communication system such as the Internet. One such distributed network, as discussed below with respect to FIG. 8, can be used to implement various aspects of the invention.

Figure 8:
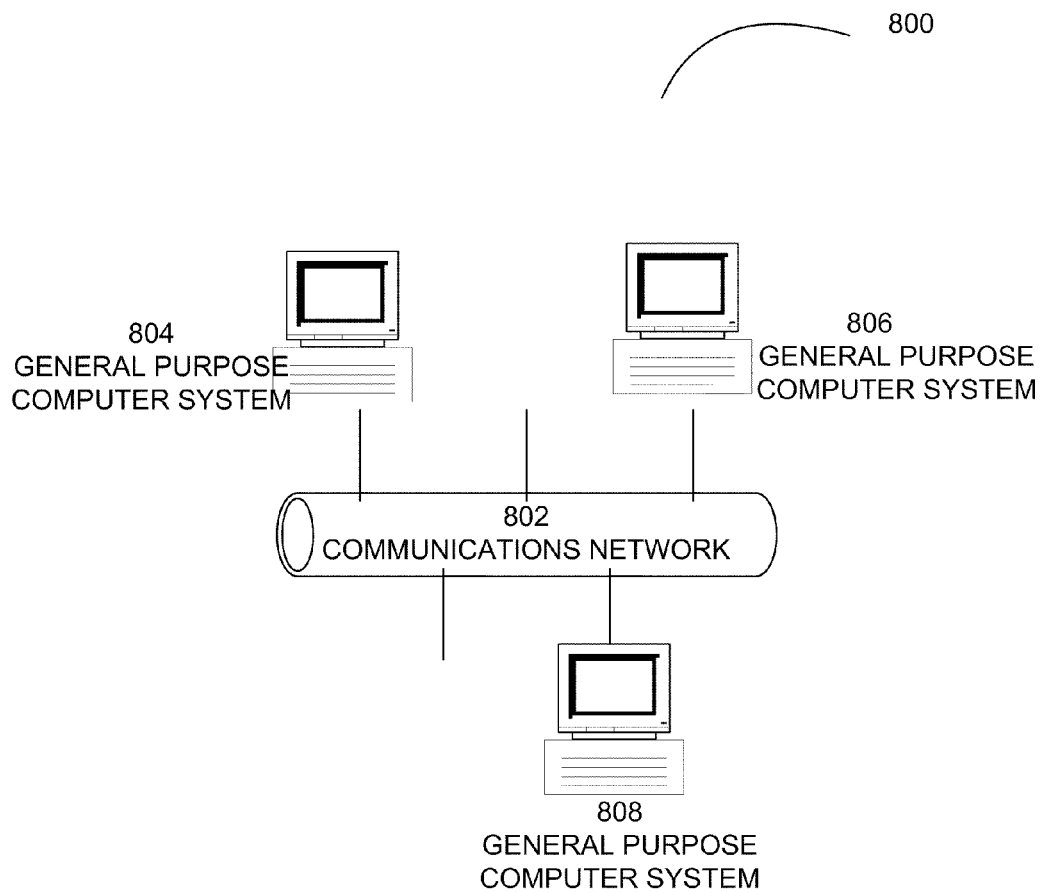
FIG. 8 is a block diagram of a system for dynamically generating taxonomies for a corpus of information, according to aspects of the invention.

FIG. 8 shows an architecture diagram of an example distributed system 800 suitable for implementing various aspects of the invention. It should be appreciated that FIG. 8 is used for illustration purposes only, and that other architectures can be used to facilitate one or more aspects of the invention.

System 800 may include one or more general-purpose computer systems distributed among a network 802 such as, for example, the Internet. Such systems may cooperate to perform functions related to taxonomy generation and analysis. In an example of one such system for dynamically generating taxonomies, one or more users operate one or more client computer systems 804, 806, and 808 through which topics are entered and communicated to a server system in order to produced taxonomies to present to the user. It should be understood that the one or more client computer systems 804, 806, and 808 may also be used to access, for example, a semantic network, separate and distinct navigation systems, separate and distinct corpora and any information associated with the corpora and/or taxonomy generation based on various aspects of the invention. In one example, users interface with the system via an Internet-based interface.

In another example, a system 804 includes a browser program such as the Microsoft Internet Explorer application program, Mozilla's FireFox, or Google's Chrome browser through which one or more websites can be accessed. Further, there can be one or more application programs that are executed on system 804 that perform functions associated with generating and/or analyzing taxonomies for classifying information. For example, system 804 may include one or more local databases for storing, caching and/or retrieving taxonomies generation information and usage.

Figure 9:
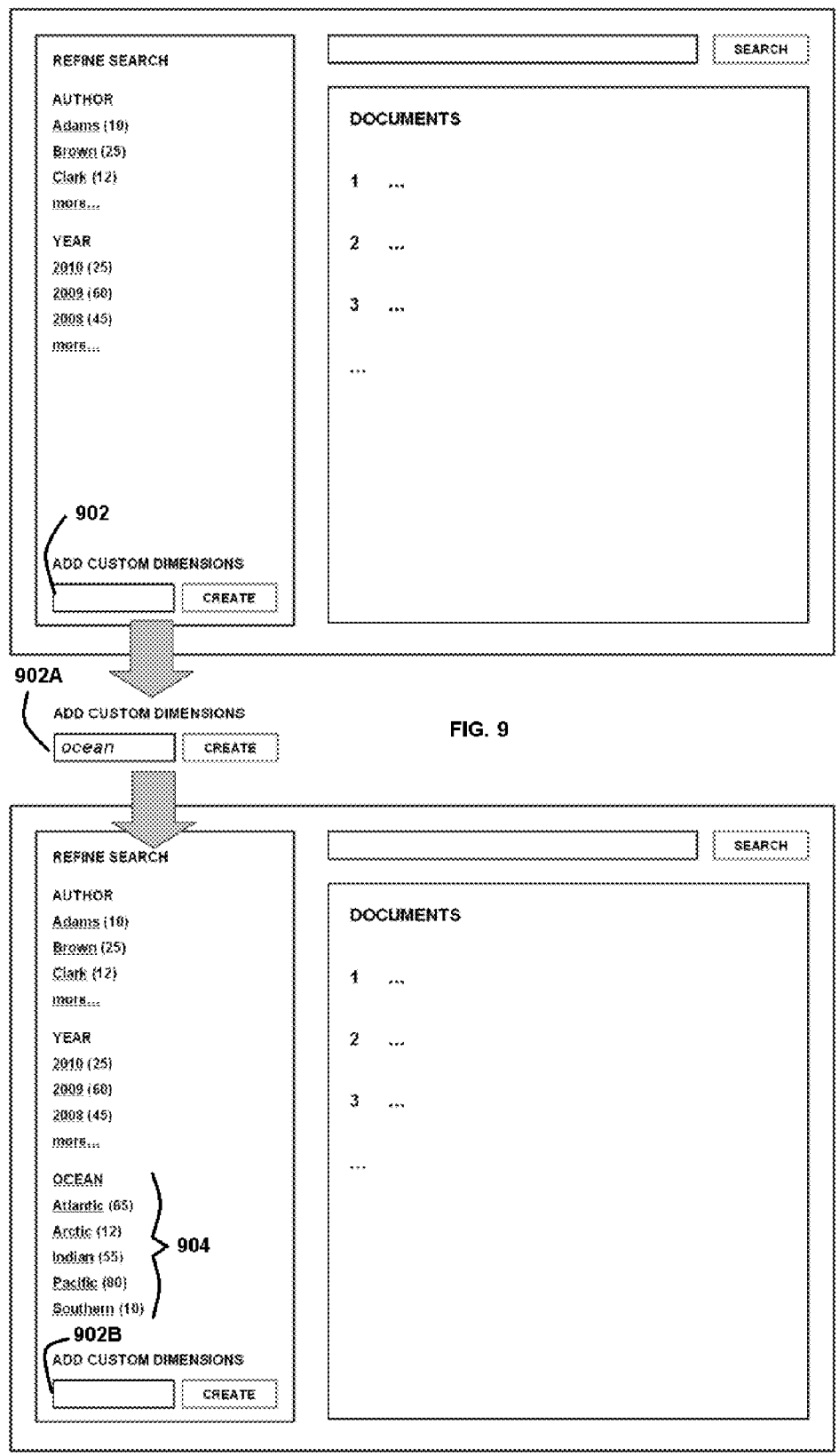
FIG. 9 illustrates examples of display screens presented to a user during taxonomy generation, according to aspects of the invention.

Various user interfaces can be rendered in displays shown on, for example, systems 1204-1208. Referring to FIG. 3, shown are examples of dynamically generated taxonomies that can be displayed during an interactive query and/or navigation session. Referring to FIG. 9, illustrated are examples of display screens presented to a user during taxonomy generation. At 902 a user enters a topic, shown at 902A, "ocean." In response to the user entered topic, the system generates a taxonomy for display to the user at 904. Additional topic can be entered at 902B, permitting generation of additional refinements.

Referring again to FIG. 8, network 802 may also include, as part of the system for dynamically generating taxonomies, one or more server systems, which can be implemented on general-purpose computers that cooperate to perform various functions including receiving user entered topics, query generation, sense and/or related term retrieval, related term evaluation, refinement generation, caching of operation results, updating corpora, and other functions. System 800 may execute any number of software programs or processes and the invention is not limited to any particular type or number of processes. Such processes can perform the various workflows associated with the system for dynamically generating taxonomies.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

I claim:

1. A computer implemented method for generating refinements within a corpus, the method comprising:
   receiving a topic from a user in a user interface;
   generating, dynamically, a plurality of terms associated with the topic, wherein the generating the plurality of terms comprises:
      communicating a query to a semantic network based on the topic;
      receiving the plurality of terms from the semantic network in response to the query;
   evaluating each of the plurality of terms against the corpus, the evaluating comprising determining that an informativeness measure for the term is within acceptable limits; and
   presenting automatically to the user, before a further interaction by the user with the user interface after receiving the topic, only the plurality of terms that are determined to have the informativeness measure within the acceptable limits, each presented term being a selectable refinement in response to receiving the topic from the user entered in the user interface, the selectable refinement associated with at least one action of a plurality of available associated actions;
   wherein the presenting automatically to the user, before the further interaction by the user with the user interface after receiving the topic, comprises displaying initial search results from the topic in the user interface, the initial search results comprising links to one or more items of the corpus, and the selectable refinement displays a number of items of the initial search results that correspond to each of the plurality of terms;
   wherein the generating comprises receiving a plurality of meanings for the topic, and the presenting comprises displaying for each of the meanings a set of one or more of the plurality of terms that relate to the meaning;
   wherein one of the selectable refinements, when selected by the user and associated with an action comprising a text search, generates additional search results that are a subset of the initial search results and that correspond to the term of the selected refinement.

2. The method according to claim 1, wherein the receiving the plurality of terms from the semantic network includes receiving at least one sense of the received topic, and wherein each of the plurality of terms corresponds to the at least one sense.

3. The method according to claim 2, wherein the threshold value that identifies informativeness of each of the plurality of terms includes a value for at least one of precision, recall, f-measure, or a salience metric.

4. The method according to claim 2, wherein the receiving the plurality of terms from the semantic network includes receiving at least one candidate term that corresponds to each sense of the at least one sense of the received topic.

5. The method according to claim 4, further comprising identifying the plurality of terms from the at least one candidate term, wherein the identifying the plurality of terms comprises:
   evaluating the at least one candidate term against a threshold value that identifies informativeness of each of the plurality of terms; and
   determining that the at least one candidate term meets the threshold value.

6. The method according to claim 2, wherein the identifying at least one sense of the topic from the semantic network includes restricting the identified at least one sense by semantic relationship.

7. The method according to claim 6, wherein the semantic relationship includes at least one of a meronym, holonym, or hyponym.

8. The method according to claim 1, further comprising comparing the plurality of terms against a threshold value that identifies informativeness of each of the plurality of terms.

9. The method according to claim 8, further comprising dynamically determining the threshold value.

10. The method according to claim 1, further comprising caching the generated plurality of terms.

11. The method according to claim 1, further comprising updating the corpus with the plurality of terms.

12. The method according to claim 1, further comprising:
    tracking a usage pattern associated with received topics; and
    updating the corpus with the plurality of terms in response to the usage pattern indicating an established user demand.

13. The method according to claim 1, further comprising associating a second action comprising a navigation operation with the plurality of terms.

14. The method of claim 1, further comprising:
    tracking selections of particular refinements on a per user basis, and tracking terms generated in response to each received topic, wherein refinement options presented to the user are displayed only when a threshold is exceeded based on the tracking.

15. A system for dynamically generating taxonomies, the system comprising:

a processor;
a memory coupled to the processor storing components that are executed by the processor;
a communication component stored in the memory and configured to receive a topic from a user input in a user interface on a host computer system;
a generation component stored in the memory and configured to dynamically generate a plurality of terms associated with the received topic;
wherein the generation component is further configured to:
communicate a query to a semantic network based on the received topic, and
receive the plurality of terms from the semantic network in response to the query;
evaluate each of the plurality of terms against the corpus, the evaluating comprising determining that an informativeness measure for the term is within acceptable limits; and
wherein the communication component is further configured to communicate to the host computer system only the plurality of terms that are determined to have the informativeness measure within the acceptable limits as a selectable refinement displayed in the user interface in response to receiving the topic from the user in the user interface, the selectable refinement associated with at least one action of a plurality of available associated actions;
wherein the displayed selectable refinement comprises displaying automatically to the user, before a further interaction by the user with the user interface after receiving the topic, initial search results from the topic in the user interface, the initial search results comprising links to one or more items of the corpus, and displaying a number of items of the initial search results that correspond to each of the plurality of terms;
wherein the generate comprises receiving a plurality of meanings for the topic, and the displaying comprises displaying automatically to the user, before the further interaction by the user with the user interface after receiving the topic, for each of the meanings a set of one or more of the plurality of terms that relate to the meaning;
wherein one of the selectable refinements, when selected by the user and associated with an action comprising a text search, generates additional search results that are a subset of the initial search results and that correspond to the term of the selected refinement.

16. The system according to claim 15, wherein each of the received plurality of terms correspond to at least one sense of the received topic.

17. The system according to claim 15, further comprising an evaluation component stored in the memory and configured to compare the plurality of terms against a threshold value that identifies informativeness of each of the plurality of terms.

18. The system according to claim 17, wherein the evaluation component is further configured to dynamically generate the threshold value.

19. The system according to claim 17, wherein the evaluation component calculates for the plurality of terms a value for at least one of precision, recall, f-measure, or a salience metric.

20. The system according to claim 15, wherein the generation component is further configured to retrieve at least one candidate term that corresponds to each sense of the at least one sense of the topic.

21. The system according to claim 20, wherein the evaluation component is further configured to:
compare the at least one candidate term against a threshold value that identifies informativeness of each of the plurality of terms; and
present the at least one candidate term as each of the plurality of terms in response to a determination that the at least one candidate term meets the threshold value.

22. The system according to claim 15, further comprising a storage component configured to:
track usage patterns associated with submitted topics; and
update the corpus with at least one term in response to the usage pattern indicating a predetermined user demand.

23. The system according to claim 15, further comprising an evaluation component configured to automatically filter each of the plurality of terms retrieved.

24. The system according to claim 15, wherein the generation component is further configured to receive the plurality of terms including the plurality of terms from the semantic network, and the system further comprises an evaluation component configured to filter, automatically, at least one of the plurality of terms.

25. The system of claim 15, wherein the generation component is further configured to track selections of particular refinements on a per user basis, and track terms generated in response to each received topic, wherein refinement options presented to the user are displayed only when a threshold is exceeded based on the tracking.

26. A non-transitory computer readable medium having instructions stored thereon that, when executed by a processor, cause the processor to generate refinements within a corpus, the generating comprising:
receiving a topic from a user in a user interface;
generating, dynamically, a plurality of terms associated with the topic, wherein the generating the plurality of terms comprises:
communicating a query to a semantic network based on the topic;
receiving the plurality of terms from the semantic network in response to the query;
evaluating each of the plurality of terms against the corpus, the evaluating comprising determining that an informativeness measure for the term is within acceptable limits; and
presenting automatically to the user, before a further interaction by the user with the user interface after receiving the topic, only the plurality of terms that are determined to have the informativeness measure within the acceptable limits, each presented term being a selectable refinement in response to receiving the topic from the user entered in the user interface, the selectable refinement associated with at least one action of a plurality of available associated actions;
wherein the presenting automatically to the user, before the further interaction by the user with the user interface after receiving the topic, comprises displaying initial search results from the topic in the user interface, the initial search results comprising links to one or more items of the corpus, and the selectable refinement displays a number of items of the initial search results that correspond to each of the plurality of terms;
wherein the generating comprises receiving a plurality of meanings for the topic, and the presenting comprises displaying for each of the meanings a set of one or more of the plurality of terms that relate to the meaning;
wherein one of the selectable refinements, when selected by the user and associated with an action comprising a text search, generates additional search results that are a subset of the initial search results and that correspond to the term of the selected refinement.

27. The non-transitory computer readable medium of claim 26, further comprising tracking selections of particular refinements on a per user basis, and tracking terms generated in response to each received topic, wherein refinement options presented to the user are displayed only when a threshold is exceeded based on the tracking.

* * * * *